Aug. 14, 1923.
W. A. PETTEYS
MOTOR TRUCK UNLOADER
Filed April 20, 1920
1,465,146
4 Sheets-Sheet 1
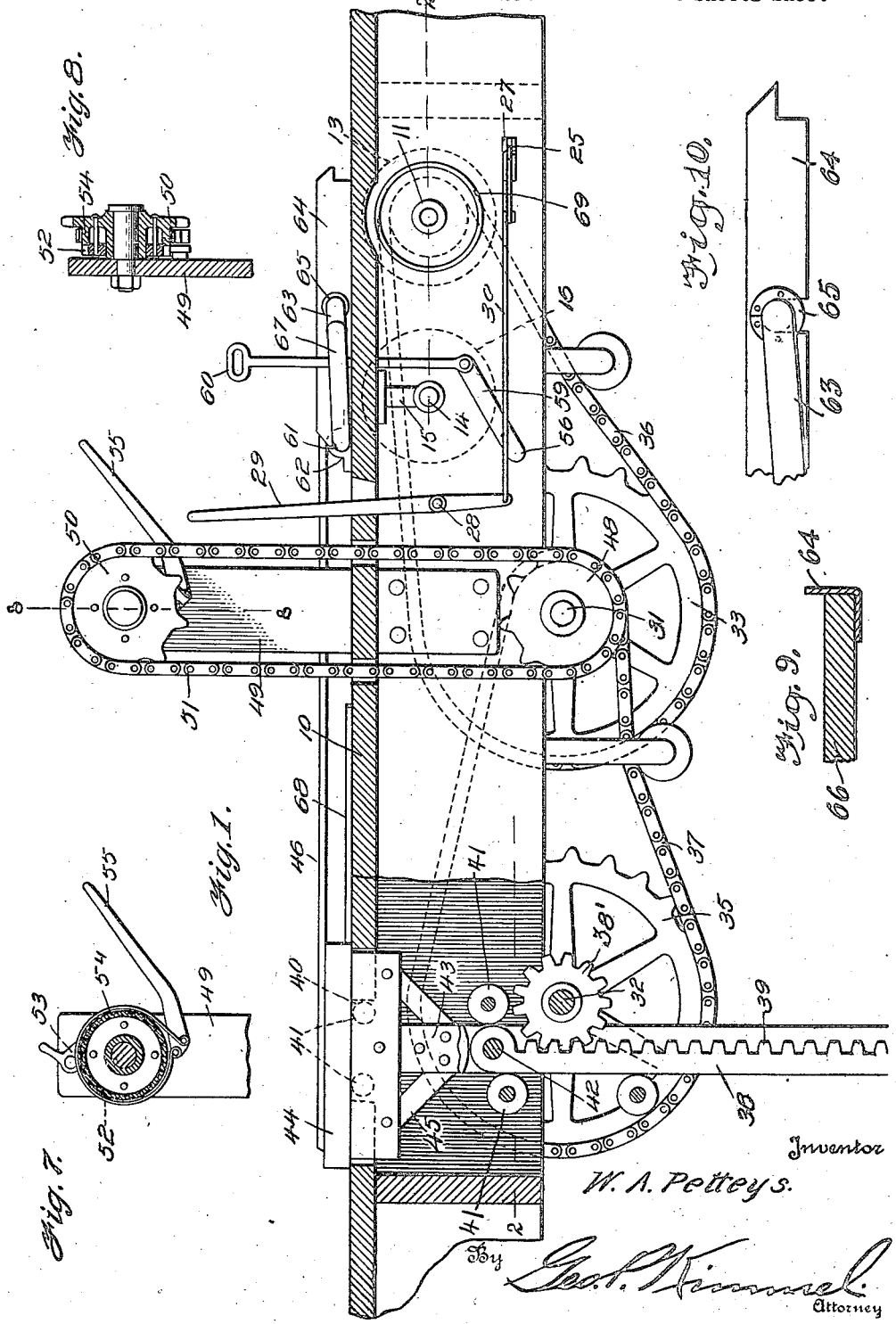
Inventor
W. A. Petteys.
By Geo. P. Kimmel.
Attorney

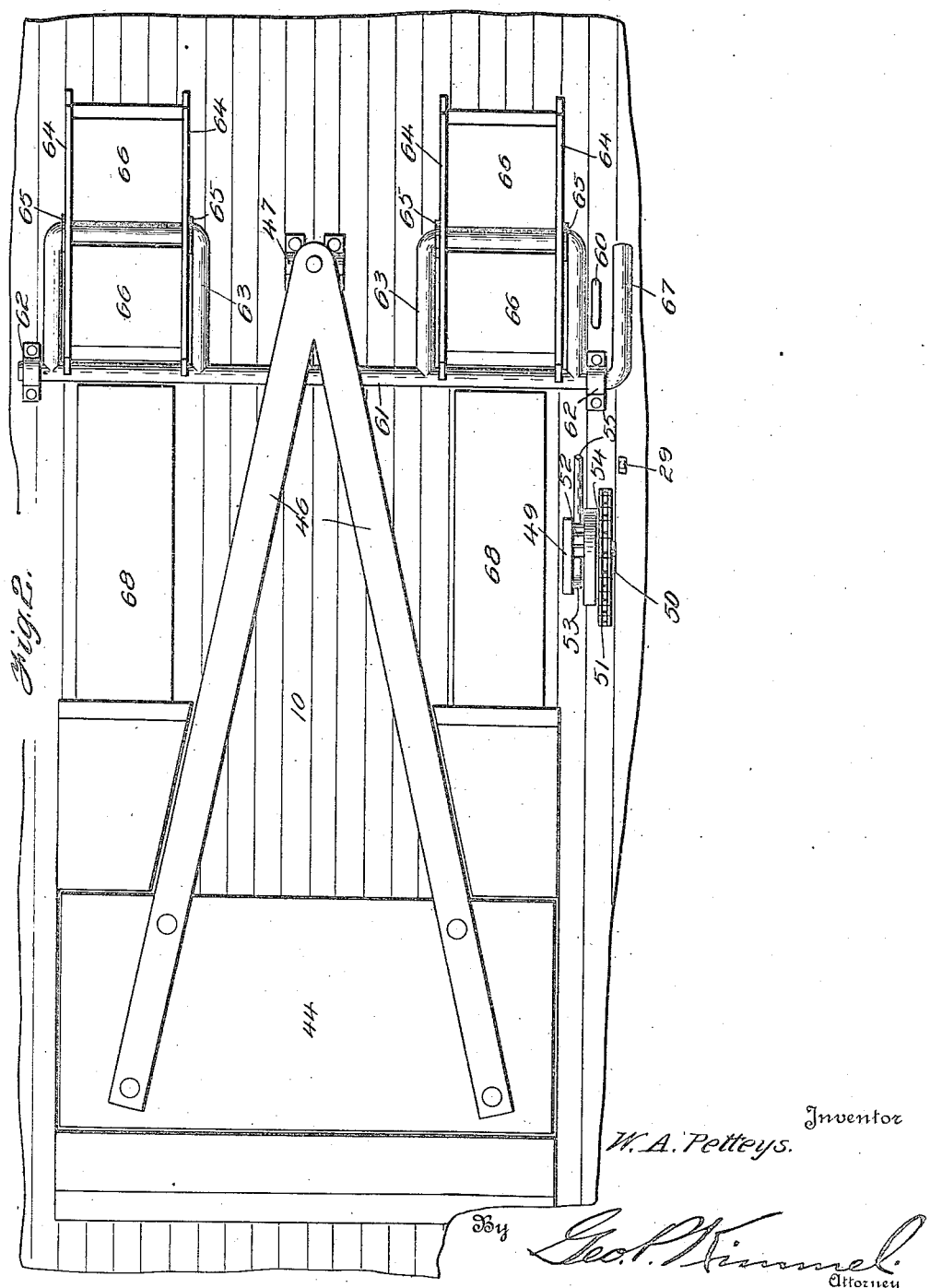

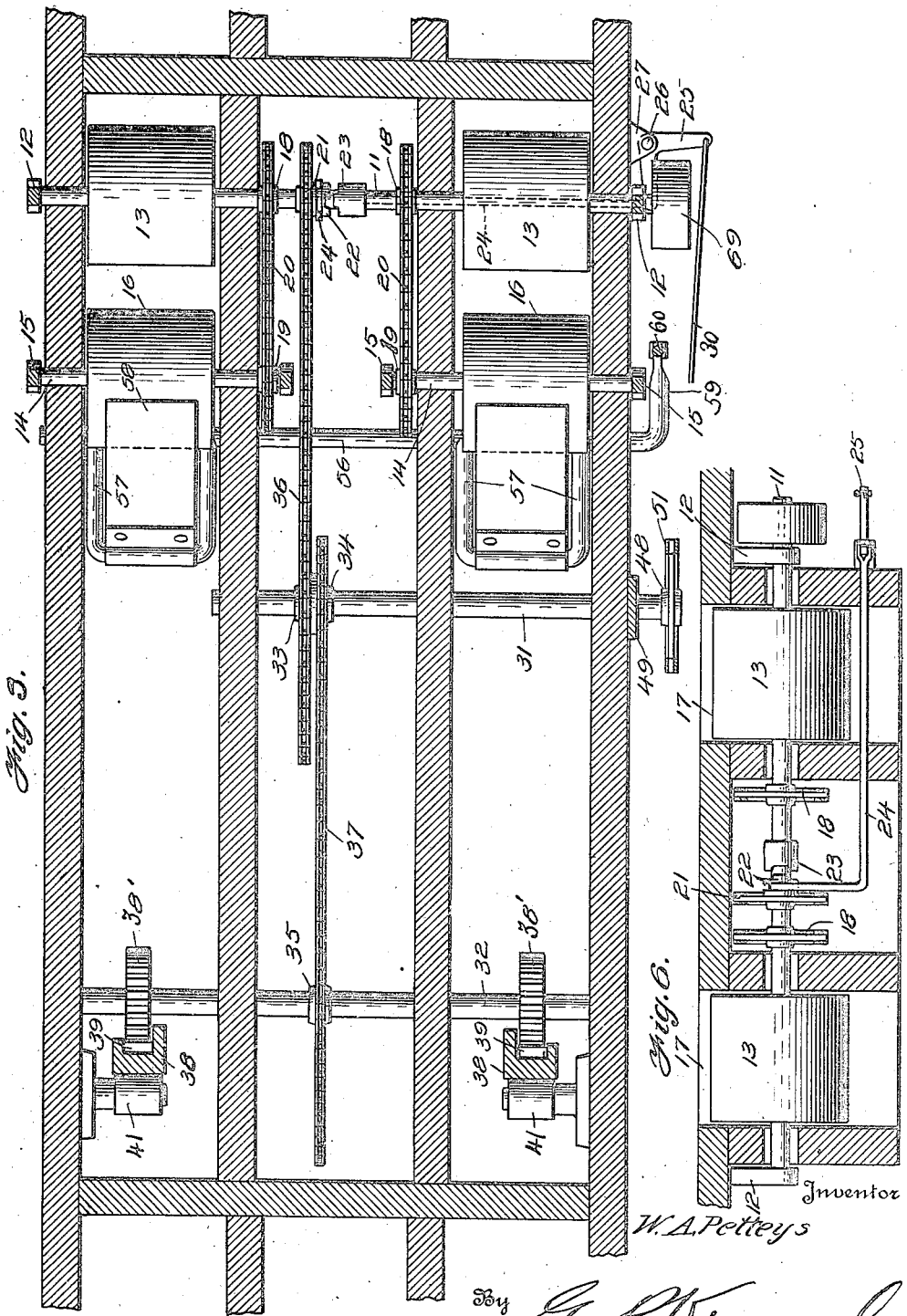

Aug. 14, 1923.
W. A. PETTEYS
1,465,146
MOTOR TRUCK UNLOADER
Filed April 20, 1920
4 Sheets-Sheet 4
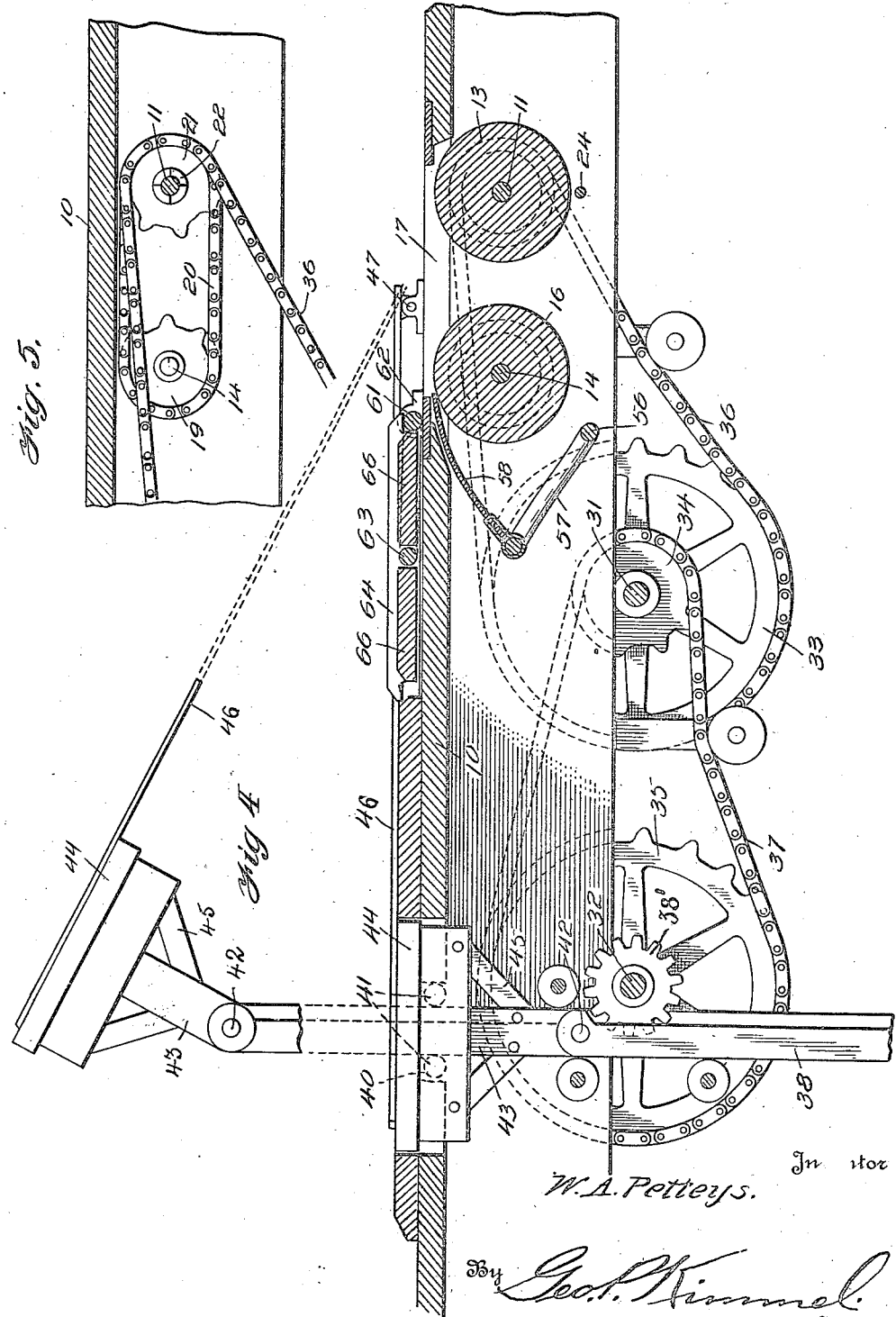

Patented Aug. 14, 1923.

1,465,146

UNITED STATES PATENT OFFICE.

WILLARD A. PETTEYS, OF WILCOX, NEBRASKA.

MOTOR-TRUCK UNLOADER.

Application filed April 20, 1920. Serial No. 375,249.

*To all whom it may concern:*

Be it known that I, WILLARD A. PETTEYS, a citizen of the United States, residing at Wilcox, in the county of Kearney and State of Nebraska, have invented certain new and useful Improvements in a Motor-Truck Unloader, of which the following is a specification.

This invention relates to vehicles discharging or dumping apparatus, and has for one of its objects to provide a device of this character wherein the motive power of an auto truck is utilized to operate a truck tilting mechanism, to cause the discharge of the load.

Another object of the invention is to provide a device of this character wherein provision is made for utilizing the motive power of the vehicle to move it into tilting position, and to release the vehicle from engagement with the tilting mechanism after the load is discharged.

Another object of the invention is to provide a device of this character wherein means are provided whereby the motive power of the vehicle is utilized to transmit power from certain parts of the tilting mechanism.

With these and other objects in view, the invention consists in certain novel features of construction as hereinafter shown and described and then specifically pointed out in the claims, and in the drawings illustrative of the preferred embodiment of the invention.

Figure 1 is a side elevation of the improved apparatus, partly in section,

Figure 2 is a plan view,

Figure 3 is a plan view with the floor or platform removed, and parts in section on the line 2—2 of Figure 1, Figure 4 is a longitudinal section, Figure 5 is a detail illustrating the arrangement of a portion of the chain driving gear, Figure 6 is a side elevation of the driving drums which are operated by the truck wheels, Figure 7 is a detail of the brake, Figure 8 is a detail of the brake device in section on the line 8—8 of Figure 1, Figure 9 is a fragmentary view, in cross section, of a closure, Figure 10 is a fragmentary view in side elevation, of a closure and its carrying member.

The improved apparatus may be installed in a storage warehouse, elevator, or other structure where grain, coal, sand, gravel, or other product or material is handled in bulk, and is designed to receive motor propelled vehicles, or auto trucks of various makes, and hold the same while being tilted to discharge or dump the load and utilize the motive power of the truck to operate the tilting mechanism.

The improved apparatus will preferably be located in an opening in the floor of the building in which the dumping action is to be performed, and it is not desired to limit the invention to any specific form of building or other structure in which the improved apparatus is installed, but for the purpose of illustration, the apparatus is shown arranged in an opening in a conventional floor or platform, represented as a whole at 10.

The improved apparatus includes a main shaft 11 suitably supported in hangers 12 beneath the floor 10. Mounted on the shaft 11 are rollers or pulleys 13 in spaced relation, the peripheral centers of the rollers being spaced to correspond substantially to the distance from center to center of the rear or driven wheels of a motor truck.

Spaced from the main shaft 11 are shorter or counter shafts 14 likewise supported in hangers 15 from the lower side of the floor 10. The shafts 14 are each provided with a roller or pulley 16 corresponding to the rollers 13.

The rollers are arranged in pairs as shown in Figures 1 and 3, and openings 17 are formed in the floor 10 above each pair of rollers, to permit the rear wheels of the truck whose load is to be dumped, to be engaged by the rollers, as hereafter explained.

The shaft 11 is provided with chain wheels 18. while the shafts 14 are provided respectively with chain wheels 19, the chain wheels receiving endless chains 20 whereby the motion of the shaft 11 is transmitted to the counter shafts 14, and the rollers correspondingly and simultaneously rotated.

Another chain wheel 21 is mounted for rotation on the shaft 11 and carries a clutch member 22, and attached to the shaft 11 and rotative therewith is an opposing clutch member 23.

The clutch member 22 is integral with the hub of the chain wheel 21 and is formed with an annular groove to receive a shifter lever 24, the lever being pivotally connected at the other end to one arm of a bell crank lever 25, while the latter is in turn pivoted at 26 to a bracket 27 attached to the floor frame.

Pivoted at 28 to the floor frame is a lever 29 and extending at its upper end above the line of the floor, and connected at its lower end to a connecting rod 30, the latter being in turn connected to the other arm of the bell crank 25.

By this arrangement the clutch member 23 may be actuated by moving the lever 29 to couple the chain wheel 21 to the shaft 11, or uncouple it therefrom, as required.

Supported for rotation below the floor 10 are two other shafts 31 and 32. The shaft 31 is provided with a relatively large chain wheel 33 and a relatively small chain wheel or pinion 34, while the shaft 32 is provided with a relatively large chain wheel 35.

The chain wheels 21 and 33 are in alinement and receive an endless chain 36, and the pinion 34 and the chain wheel 35 are in alinement and receive an endless chain 37.

By this arrangement the relatively high speed of the shaft 11, will be transmitted at a slow speed to the shaft 32, and with a corresponding increase of power.

Arranged for vertical movement through the floor 10, are channeled bars 38, in spaced relation, each bar having a gear rack 39.

The bars are supported in suitable guides 40 which include antifriction rollers 41, so that they move with the minimum of friction.

At its upper end each of the bars 38 is pivoted at 42 to standards 43, and mounted upon the standards is a platform 44, the standards being braced from the platform as shown at 45.

Connected to the platform 44 are rail members 46 which converge to a point substantially midway between the two sets of drums 13 where they are united and coupled to a pivot pin 47 suitably supported upon the floor 10 between the openings 17. Mounted on the shaft 32 are pinions 38' engaging the racks 39.

By this arangement it will be obvious that rotary motion of the shaft 11 will be transmitted to the shaft 32 and cause the elevation of the bars 38 and the platform 44, the latter moving in the arc of a circle of which the pin 42 is the center.

The platform 44 supports the forward wheels of a motor truck when the rear wheels are engaged by the drums 13.

Carried on the shaft 31 is a small chain wheel 48, and supported on the floor 10 is a standard 49 carrying a chain wheel 50 in alinement with the chain wheel 48, a chain 51 operating over the chain wheels, a ratchet 52 is carried by the chain wheel 50 and is engaged by a pawl 53 pivoted on the standard 49. The rotation of the shaft 31 is communicated to the chain wheel 50 and the ratchet 52 operates to prevent retrograde movement of the chain 51, hence the latter operates as a brake or check to prevent the platform 44 moving downwardly so long as the pawl remains in engagement with the ratchet. When the platform is to be returned to its lower position substantially level with the floor 10, the pawl 53 is released when the weight of the platform will cause it to descend.

Formed at one side of the ratchet 52 is a brake drum 54 with which a brake lever 55 is adapted to be engaged, to control the movements and prevent too rapid descent of the platform and its load.

Mounted for oscillation in suitable supports beneath the floor 10 is a rock shaft 56, and extending from the rock shaft are inverted U-shaped members 57, each carrying a plate 58 adapted to be disposed over the upper face of the drums 16 when the rock shaft is moved in one direction, and to be withdrawn beneath the floor when moved in the opposite direction. At one end the rock shaft is provided with an arm 59 to which a pull rod 60 is attached and leads upwardly through the floor. By this means the plates 58 may be disposed above the rollers 16 by manipulating the pull rod 60, to enable the motor truck to "climb" out of the openings 17 after its load is discharged, as hereafter explained.

Extending over the upper face of the floor 10, just in advance of the openings 17, is another rock shaft 61, supported in bearings 62 and provided with polygonal shaped carrying members 63, one for each of the opening 17.

Mounted to swing upon each carrying member is a closure for the adjacent opening 17.

Each of the closures carried by a member 63, comprises a pair of side bars 64, angle shaped in cross section, and each of the bars 64, has its vertical web slotted and extending through the slots of the bars 64, is a carrying member 63, upon which the closure swings, and the member 63, is connected with each side bar 64, by a collar 65. Each of the closures further includes a body portion 66, and which is mounted on the horizontal web of the side bars 64, whereby the body portion 66, is supported, and the said body portion is preferably constructed of wood, with the ends thereof chamfered or inclined as shown.

At their ends the vertical webs of the side members 64 are undercut to alternately engage over the rock shaft 61 when the closures are either in closed or open position.

At one end the rock shaft 61 is extended into an operating handle or lever 67, accessible from above the floor.

The main shaft 11 is extended at one end and provided with a belt pulley 69, or other power transmitting element, so that the motor truck motive power may be utilized for transmitting power otherwise than to the elevating mechanism of the platform 44. Suitable wear plates 68 are disposed upon the floor 10 to receive the closure elements when the latter are in open position.

With an apparatus thus constructed, the operation is as follows.

Initially the mechanism will be arranged to hold the platform 44 in its lower position, the closures for the openings 17 in closed position, the plates 58 withdrawn from over the drums 16, and the lever 29 operated to open the clutch 22 and 23.

Thus a practically unobstructed driveway is provided for the loaded motor truck which is moved forwardly until the forward wheels have passed over the closure elements 66. The engines of the truck are then stopped and the lever 67 actuated to swing the closure elements over until the latter are disposed upon the wear plates 68, and the openings 17 uncovered.

The motor is again started to move the truck forwardly until the forward wheels rest on the platform 44 and the rear wheels drop through the openings 17 and upon the drums 13 and 16.

The lever 29 is then reversed to cause the closing of the clutch 22 and 23 and the motor engines started. This will cause the revolving rear wheels of the truck to engage the drums 13 and 16 and rapidly rotate them and transmit motion to the shaft 32 and elevate the bars 38 by the coaction of the gears 48 and racks 39, and the platform 44 supported thereby.

This movement will tilt the motor truck into load discharging position, the material composing the load running out through the "tail" of the body or box.

While the truck is being elevated into discharging position the rotation of the shaft 31 will correspondingly rotate the ratchet 52, whose pawl 53 will hold the chain 51 and consequently the platform 44 and the tilted truck from retrograde movement.

When the load has been discharged, the brake is applied, the pawl 53 released and the clutch 23 also released, when the unloaded truck will cause the platform 44 to return to horizontal position by gravity, the return movement being effectually controlled by the brake device, as will be obvious. The pull rod 60 is then operated to move the wedge shaped free edges of the plates 58 between the drums 16 and the rear wheels of the truck which will cause the plates to serve as chocks to the revolving wheels of the truck and cause the truck to quickly climb out of the openings 17 pass over the adjacent closure members 64—66 and thence over the platforms 44 and out of the building.

The closures 64—66 are then restored to closed position ready to receive the next loaded truck.

The improved apparatus may be installed in warehouses, storage houses, elevators, or in connection with unloading platforms, or the like, and may be readily adapted without material structural change to trucks or like vehicles.

The floor portion 10 may be the ordinary floor of a building, or the floor or platform of an unloading structure, as may be found most convenient.

The preferred embodiment of the invention is disclosed in the drawings and set forth in the specifications, but it will be understood that any modifications within the scope of the claims may be made in the construction without departing from the principle of the invention or sacrificing any of its advantages.

I claim:

1. In an apparatus of the class described, a supporting body having openings to receive the rear wheels of a motor driven vehicle, a platform to receive the forward wheels of a motor driven vehicle, cover elements for said openings to provide bridge devices to carry the wheels of the motor driven vehicle over the openings, means for operating said bridging devices, two pairs of rotatable drums disposed in position to be engaged by the rear wheels of the motor driven vehicle when they drop through the body openings and rotatable thereby, a main shaft for connecting one of the drums of one pair to one of the drums of the other pair, operative connections between the drums of each pair, said operative connections arranged wholly within the said supporting body, means for elevating said platform to dispose the vehicle in discharging position, means for causing the motion of the drums to be transmitted to the platform elevating means, and a clutching device on said main shaft for operatively connecting said transmission means therewith.

2. In an apparatus of the class described, a supporting body, a platform for receiving the forward wheels of a motor driven vehicle, bars connected to said platform and converging toward and united at their terminals, means for swingingly coupling said bars at their converging ends to the body and causing said platform to swing upon its coupling, and means operative by the motor of the vehicle for operating the actuating means of said platform to tilt the vehicle into load discharging position.

3. In an apparatus of the class described, a supporting body, a platform for receiving the forward wheels of the motor driven vehicle and swingingly coupled to said body, a pair of rearwardly extending bars connected at their forward ends in proximity to each side of said platform and having their rear ends merging into each other, means for swingingly coupling the rear ends of said bars to said body and means operated by the motor of a vehicle for actuating the means for causing said platform to swing upon its coupling.

4. In an apparatus of the class described, a supporting body having openings to receive the rear wheels of the motor driven vehicle, a platform to receive the forward wheels of a motor driven vehicle, rotatable drums disposed in position to be engaged by the rear wheels of the motor driven vehicle when they drop through said openings and rotatable thereby, means for elevating said platform to dispose the vehicle in discharging position, means for causing the motion of the drums to be transmitted to the platform elevating means, means to provide for the lowering of the vehicle, a manually operated rock shaft provided with a plurality of U-shaped members, a chock element carried by each of said members and adapted to be positioned over the drums to facilitate the shifting of the rear wheels of the vehicle off the drums, a manually operated rock shaft provided with a plurality of polygonal shaped members, and a closure element carried by each of said polygonal members for closing said openings when a rear wheel of a vehicle has been removed therefrom.

5. In an apparatus of the class described, a supporting body having openings to receive the rear wheels of the motor driven vehicle, a platform to receive the forward wheels of a motor driven vehicle, rotatable drums disposed in position to be engaged by the rear wheels of the motor driven vehicle when they drop through said openings and rotatable thereby, means for elevating said platform to dispose the vehicle in discharging position, means for causing the motion of the drums to be transmitted to the platform elevating means, means to provide for the lowering of the vehicle, a manually operated rock shaft provided with a plurality of U-shaped members, a chock element carried by each of said members and adapted to be positioned over the drums to facilitate the shifting of the rear wheels of the vehicle off the drums, a manually operated rock shaft provided with a plurality of polygonal shaped members and a closure element carried by each of said polygonal members for closing said openings when a rear wheel of a vehicle has been removed therefrom, and wear plates positioned forwardly of said closure elements.

In testimony whereof, I affix my signature hereto.

WILLARD A. PETTEYS.